United States Patent

Shima (10) Patent No.: US 10,349,050 B2
(45) Date of Patent: Jul. 9, 2019

(54) IMAGE CODING APPARATUS, IMAGE CODING METHOD AND RECORDING MEDIUM

(71) Applicant: CANON KABUSHIKI KAISHA, Tokyo (JP)

(72) Inventor: Masato Shima, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 407 days.

(21) Appl. No.: 15/000,442

(22) Filed: Jan. 19, 2016

(65) Prior Publication Data

US 2016/0219274 A1 Jul. 28, 2016

(30) Foreign Application Priority Data

Jan. 23, 2015 (JP) ................................. 2015-011726

(51) Int. Cl.
*H04N 19/00* (2014.01)
*H04N 19/11* (2014.01)
*H04N 19/176* (2014.01)
*H04N 19/147* (2014.01)
*H04N 19/436* (2014.01)
(Continued)

(52) U.S. Cl.
CPC ........... *H04N 19/11* (2014.11); *H04N 19/147* (2014.11); *H04N 19/176* (2014.11); *H04N 19/436* (2014.11); *H04N 19/19* (2014.11); *H04N 19/593* (2014.11)

(58) Field of Classification Search
CPC ........... H04N 19/00; H04N 7/00; H04N 11/00
See application file for complete search history.

(56) References Cited

U.S. PATENT DOCUMENTS

2015/0063440 A1* 3/2015 Pang .................... H04N 19/174
375/240.02
2016/0219274 A1* 7/2016 Shima .................... H04N 19/11

FOREIGN PATENT DOCUMENTS

JP 2006-005438 A 1/2006
JP 2009-177352 A 8/2009
JP 2013258732 A 12/2013

OTHER PUBLICATIONS

"Series H: Audiovisual and Multimedia Systems Infrastructure of audiovisual services—Coding of moving video, Hight efficiency video coding", Recommendation ITU-T H.265, International Telecommunications Union, (Apr. 2013), 5 pages.

(Continued)

*Primary Examiner* — Maryam A Nasri
(74) *Attorney, Agent, or Firm* — Carter, DeLuca & Farrell LLP (57) ABSTRACT

A selecting unit selects, from plural intra prediction modes, the intra prediction mode to be used for intra prediction coding of a target coding block. A coding unit performs the intra prediction coding to a frame constituted by plural blocks in units of the block, in the intra prediction mode selected by the selecting unit. Further, in a case where inter prediction coding can be used as a coding system of the frame in which the target coding block is included, the selecting unit considers the neighboring blocks of the target coding block to have been coded with the inter prediction and selects the intra prediction mode to be used for the intra prediction coding of the target coding block from among the plural intra prediction modes.

7 Claims, 9 Drawing Sheets

(51) Int. Cl.
H04N 19/593 (2014.01)
H04N 19/19 (2014.01)

(56) References Cited

OTHER PUBLICATIONS

Notification of Reasons of Refusal issued in corresponding Japanese application No. 2015011726 dated Jul. 31, 2018, with English translation, 7 pages.

* cited by examiner

IMAGE CODING APPARATUS, IMAGE CODING METHOD AND RECORDING MEDIUM

BACKGROUND OF THE INVENTION

Field of the Invention

The present invention relates to an image coding apparatus, an image coding method, and a recording medium storing a program for causing a computer to perform the image coding method.

Description of the Related Art

As a coding system to be used in moving image compression recording, the video coding format of H.264/MPEG-4 AVC (hereinafter, called H.264) has been known. In recent years, an activity for international standardization of the further effective coding system has been started, and the JCT-VC (Joint Collaborative Team on Video Coding) was established. The JCT-VC has proceeded with standardization of an HEVC (High Efficiency Video Coding) system (hereinafter, called HEVC). In the HEVC, to improve coding efficiency, intra-frame prediction (hereinafter, called intra prediction) for which correlation between pixels in a frame is utilized and inter-frame prediction (hereinafter, called inter prediction) for which temporal correlation between different frames is utilized are performed to perform coding of prediction errors.

Figure 9:
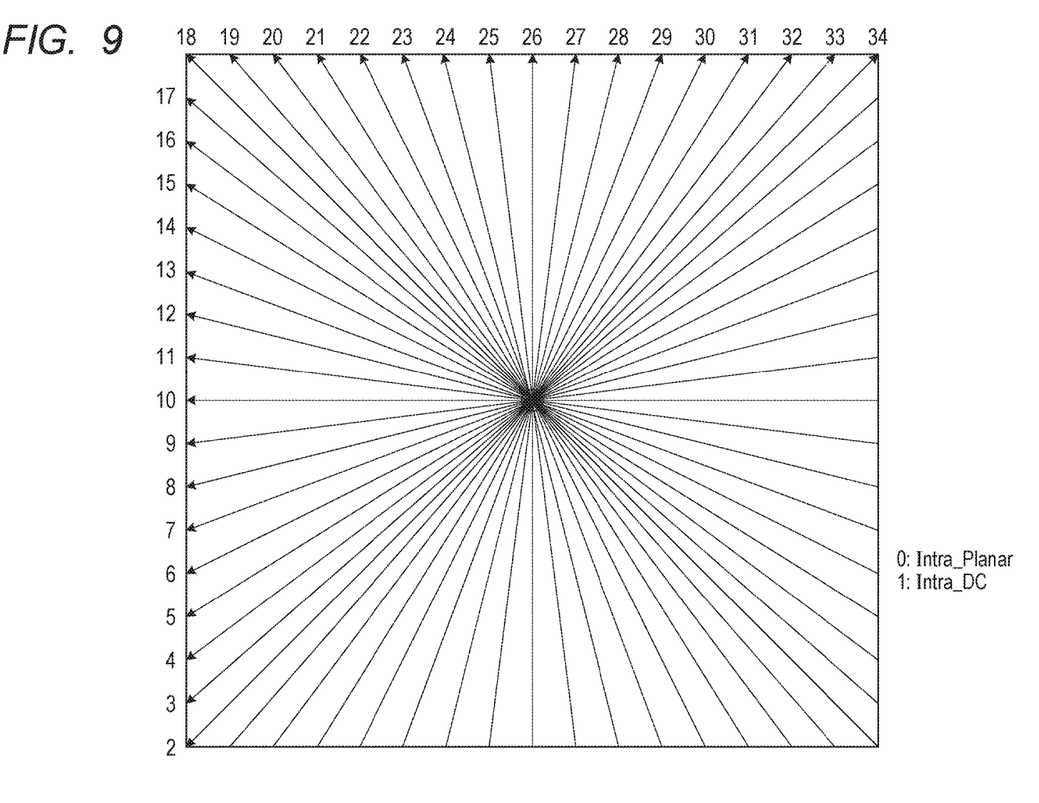
FIG. 9 is a diagram for describing an intra prediction mode in an HEVC system.

The intra prediction is performed based on the size of an intra prediction block (hereinafter, called intra prediction block size) being a unit of prediction. In the HEVC, as the intra prediction block size, it is possible to use five kinds of sizes of horizontal 4 pixels and vertical 4 pixels (hereinafter, called 4×4 pixels), 8×8 pixels, 16×16 pixels, 32×32 pixels, and 64×64 pixels. Further, in the HEVC, 35 intra prediction modes as illustrated in FIG. 9 are defined to further achieve higher efficient coding.

Moreover, in the HEVC, in a CTU (Coding Tree Unit) to be used as a coding block unit, it is possible to mixedly use an intra prediction block for the intra prediction and an inter prediction block for the inter prediction. Incidentally, in the H.264, it is impossible to mix the intra prediction block for the intra prediction and the inter prediction block for the inter prediction in a macro block being a coding unit.

As described above, the five kinds of intra prediction block sizes can be provided and the 35 intra prediction modes are defined in the HEVC. Therefore, when an optimum combination is selected from the many intra prediction block sizes and the many intra prediction modes, a large operation amount is necessary. In this connection, a method of performing a pipeline process in units of coding block is conceivable.

In the HEVC, since it is necessary to calculate a predictive generated code amount of each intra prediction mode to select an optimum intra prediction mode, it is necessary to refer to the intra prediction modes of the neighboring blocks. In a case where the pipeline process is performed to the determination of the intra prediction mode, there is a case where the intra prediction modes of the neighboring blocks are not settled when the intra prediction mode of the target processing block is determined. As a result, the code amount necessary for selecting the intra prediction mode of the target processing block cannot be calculated, and thus there is a problem that it is impossible to select the optimum intra prediction mode. In the method disclosed in Japanese Patent Application Laid-Open No. 2006-005438, in the case where the intra prediction mode of the adjacent block is not settled, the above problem is solved by using the intra prediction mode already settled in another block. Moreover, in the method disclosed in Japanese Patent Application Laid-Open No. 2009-177352, in the case where the intra prediction mode of the adjacent block is not settled, the above problem is solved by using the intra prediction mode in the temporally closest block.

However, in the HEVC, the intra prediction block for the intra prediction and the inter prediction block for the inter prediction can mixedly exist within the CTU being the coding tree unit. Therefore, even if the intra prediction mode of a certain block in the CTU is once determined by the intra prediction mode determining process, there is a case where the determined intra prediction mode is decided as the inter prediction mode in the later pipeline-stage process and thus replaced by the inter prediction mode.

In such a case, in the stage of the intra prediction mode determining process at the early part of the pipeline process, it is impossible to distinguish whether the intra prediction modes of the neighboring blocks of the target processing block are replaced by the inter prediction modes by means of the later pipeline-stage process. Therefore, since it is impossible to calculate the code amount necessary for selecting the intra prediction mode of the target processing block, there is a new problem that the optimum intra prediction mode cannot be selected. The methods disclosed in Japanese Patent Application Laid-Open No. 2006-005438 and Japanese Patent Application Laid-Open No. 2009-177352 described above cannot cope with the new problem.

SUMMARY OF THE INVENTION

In order to solve the above problem, the present invention aims to provide an image coding technique of enabling to, even in a case where a block for performing intra prediction and a block for performing inter prediction can mixedly exist in a coding tree unit, effectively determine the intra prediction mode at high speed.

According to one aspect of the present invention for solving the above problem, there is provided an image coding apparatus which comprises: a selecting unit configured to select, from plural intra prediction modes, the intra prediction mode to be used for intra prediction coding of a target coding block; and a coding unit configured to perform the intra prediction coding to a frame constituted by plural blocks in units of the block, in the intra prediction mode selected by the selecting unit, wherein, in a case where inter prediction coding can be used as a coding system of the frame in which the target coding block is included, the selecting unit considers the neighboring block of the target coding block to have been coded with the inter prediction and selects the intra prediction mode to be used for the intra prediction coding of the target coding block from among the plural intra prediction modes.

Further features of the present invention will become apparent from the following description of exemplary embodiments with reference to the attached drawings.

DESCRIPTION OF THE EMBODIMENTS

Hereinafter, preferred embodiments of the present invention will be described in detail with reference to the accompanying drawings. Incidentally, the constitution, the configuration and the like described in the following embodiments are merely examples. Namely, it should be noted that the present invention is not limited to the constitution and the like described in the drawings.

(Embodiment)

Figure 1:
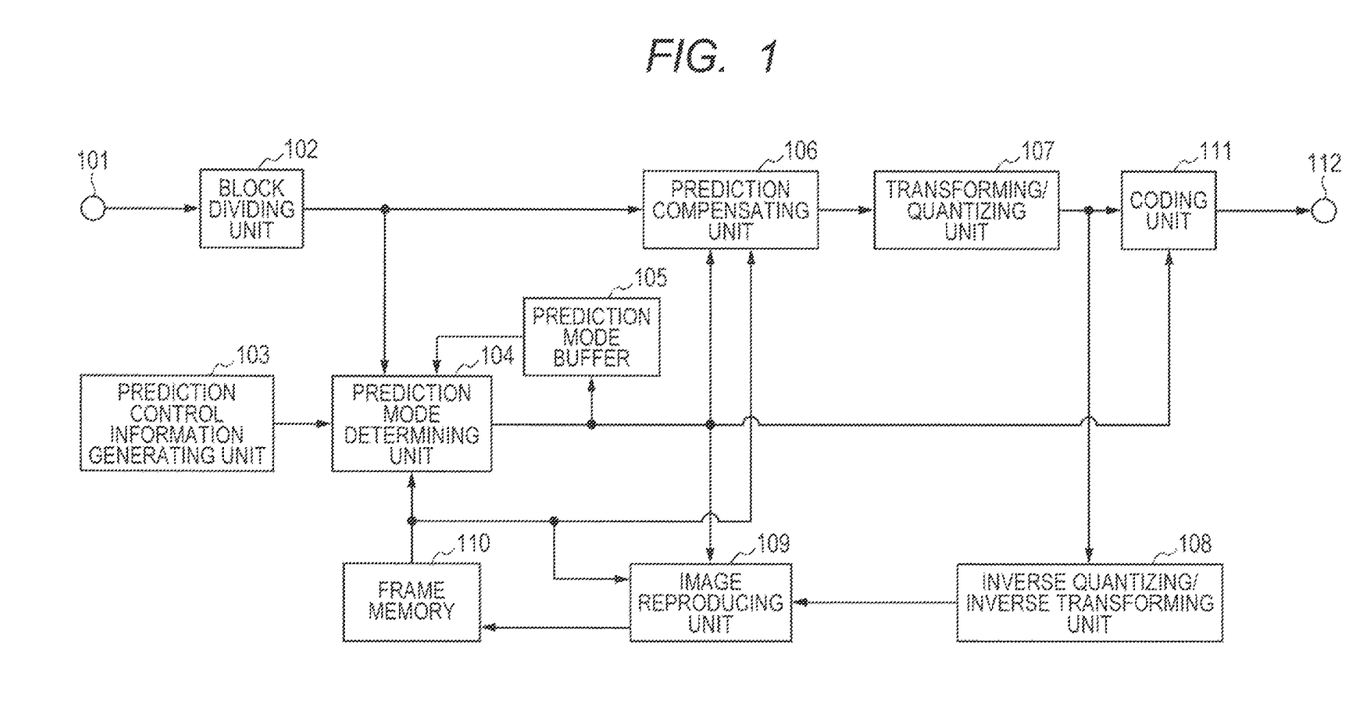
FIG. 1 is a block diagram illustrating a constitution example of an image coding apparatus according to an embodiment of the present invention.

FIG. 1 is a block diagram illustrating a constitution example of an image coding apparatus according to an embodiment of the present invention. An image coding apparatus 100 may have a circuit configuration as illustrated in FIG. 1 as the hardware. In FIG. 1, a terminal 101 is an input terminal for inputting image data. A block dividing unit 102 cuts out the image data, which was input, into plural blocks and outputs the image data in tree (block) units to the subsequent stage. In the present invention, although it will be described under the state that the input image is divided into CTUs respectively consisted of 64×64 Pixels and each of these pixels is further divided into blocks of 8×8 pixels, a block dividing method is not limited to this case. The block size may be determined in accordance with property of the input image or the block size, by which a coding cost is minimized, may be adaptively selected by calculating the coding cost for each the block size.

A prediction control information generating unit 103 generates prediction control information used for controlling the calculation of priority modes to be described later required in determining an intra prediction mode and then outputs the generated prediction control information. In the present embodiment, when a target coding frame is configured by only the intra prediction (intra-frame prediction utilizing correlation between pixels in a frame), the prediction control information is assumed to be denoted by "0". In addition, when the target coding frame can use the inter prediction (inter-frame prediction utilizing temporal correlation between different frames), the prediction control information is assumed to be denoted by "1". However, a determining method of the prediction control information or a combination of the values is not limited to this case. The prediction control information may be determined by the property of an input image or an input from a user (not illustrated).

A prediction mode determining unit 104 determines an optimum prediction mode by performing the intra prediction, which is an intra-frame prediction, or the inter prediction, which is an inter-frame prediction. The prediction mode described here means a flag for identifying if the intra prediction is used or the inter prediction is used, the intra prediction mode in case of using the intra prediction, a motion vector in case of using the inter prediction or the like. In the present embodiment, information of this prediction mode is called prediction information.

Figure 2:
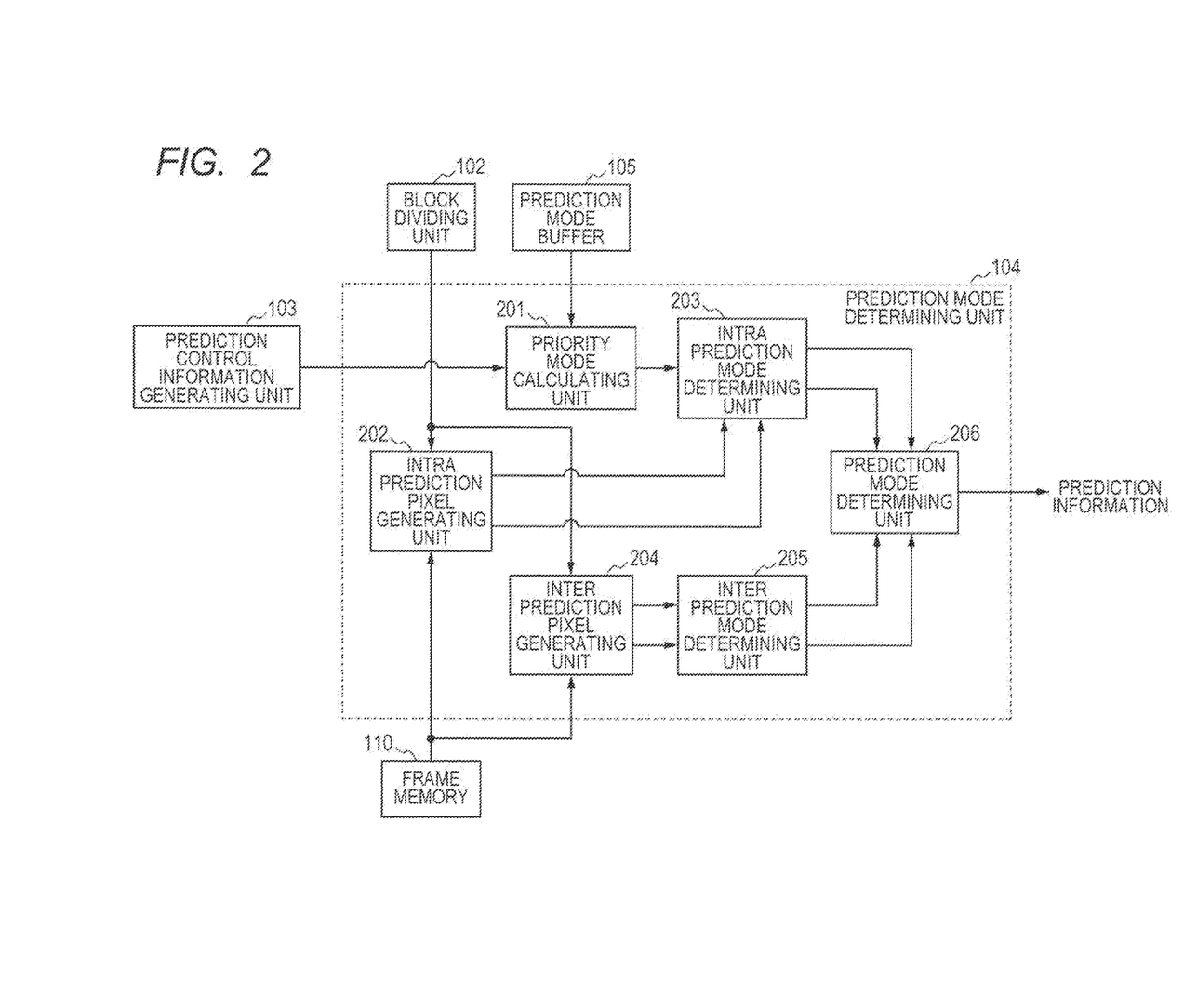
FIG. 2 is a block diagram illustrating a constitution example of a prediction mode determining unit according to the embodiment.

FIG. 2 is a block diagram illustrating a constitution example of the prediction mode determining unit 104. A priority mode calculating unit 201 calculates priority mode information required in determining the intra prediction mode from the prediction control information which was input from the prediction control information generating unit 103 or prediction information of neighboring blocks which was input from a prediction mode buffer 105. A specific method regarding calculation of the priority mode information will be described later.

An intra prediction pixel generating unit 202 generates an intra prediction image for each the intra prediction mode from neighboring coded pixels of a target coding block by properly referring to a frame memory 110. In addition, the intra prediction pixel generating unit 202 calculates prediction errors from the generated intra prediction image and a block-level (tree-level) input image which was input from the block dividing unit 102 and then outputs the calculated prediction errors to an intra prediction mode determining unit 203 together with information of the corresponding intra prediction mode.

The intra prediction mode determining unit 203 calculates a coding cost for each the intra prediction mode from the priority mode information which was input from the priority mode calculating unit 201 or the prediction errors which were input from the intra prediction pixel generating unit 202 and information of the intra prediction mode. Then, the intra prediction mode determining unit 203 determines an optimum intra prediction mode by comparing the calculated coding cost for each the intra prediction mode with others and then outputs the determined optimum intra prediction mode to a prediction mode determining unit (or a prediction mode determiner) 206 together with information of the corresponding coding cost.

An inter prediction pixel generating unit 204 generates an inter prediction image for each the motion vector from pixels of a picture which was coded before a target coding picture is coded. In addition, the inter prediction pixel generating unit 204 calculates prediction errors from the generated inter prediction image and the block-level input image, which was input from the block dividing unit 102, and then outputs the calculated prediction errors to an inter prediction mode determining unit 205 together with information of the corresponding motion vector.

The inter prediction mode determining unit 205 calculates a coding cost for each the motion vector from the prediction error for each the motion vector which was input from the inter prediction pixel generating unit 204 and information of the motion vector. Then, the inter prediction mode determining unit 205 determines an optimum motion vector by comparing the calculated coding cost for each the motion vector with others and then outputs the determined optimum motion vector to the prediction mode determining unit 206 together with information of the corresponding coding cost.

The prediction mode determining unit 206 determines an optimum coding mode by comparing a coding cost of the intra prediction which was input from the intra prediction mode determining unit 203 with a coding cost of the inter prediction which was input from the inter prediction mode determining unit 205. In case of determining to use the intra prediction, the prediction mode determining unit 206 outputs identification information indicating the intra prediction together with information of the intra prediction mode, which was input from the intra prediction mode determining unit 203, as the prediction information. On the other hand, in case of determining to use the inter prediction, the prediction mode determining unit 206 outputs identification information indicating the inter prediction together with information of the motion vector, which was input from the inter prediction mode determining unit 205, as the prediction information.

The description is returned to FIG. 1, where the prediction mode buffer 105 holds block-level prediction information which was output from the prediction mode determining unit 104. A prediction compensating unit 106 performs the intra prediction, the inter prediction or the like to block-level image data which was input from the block dividing unit 102 on the basis of the prediction information, which was output from the prediction mode determining unit 104, and generates prediction image data. In addition, the prediction compensating unit 106 calculates the prediction errors from the image data, which was input, and the prediction image data and then outputs the calculated prediction errors.

A transforming/quantizing unit 107 obtains transformation coefficients by orthogonally transforming the prediction errors, which were input from the prediction compensating unit 106, in block-by-block basis (tree-by-tree basis) and further obtains quantization coefficients by performing the quantization. An inverse quantizing/inverse transforming unit 108 reproduces the transformation coefficients by inversely quantizing the quantization coefficients which were input from the transforming/quantizing unit 107 and further reproduces the prediction errors by performing an inverse orthogonal transformation. An image reproducing unit 109 generates prediction image data by properly referring to the frame memory 110 on the basis of the prediction information which was output from the prediction mode determining unit 104 and generates reproduction image data from the generated prediction image data and the prediction errors which were input from the inverse quantizing/inverse transforming unit 108 and then outputs the generated reproduction image data.

The frame memory 110 is such a memory of storing the image data which was reproduced in the image reproducing unit 109. The reproduction image data stored in the frame memory 110 is referred by the prediction mode determining unit 104 and the prediction compensating unit 106. A coding unit 111 generates a bitstream by coding the quantization coefficients which were output from the transforming/quantizing unit 107 and the prediction information which was output from the prediction mode determining unit 104 and then outputs the generated bitstream. A terminal 112 is an output terminal used for outputting the bitstream, which was generated in the coding unit 111, to the outside.

Figure 3:
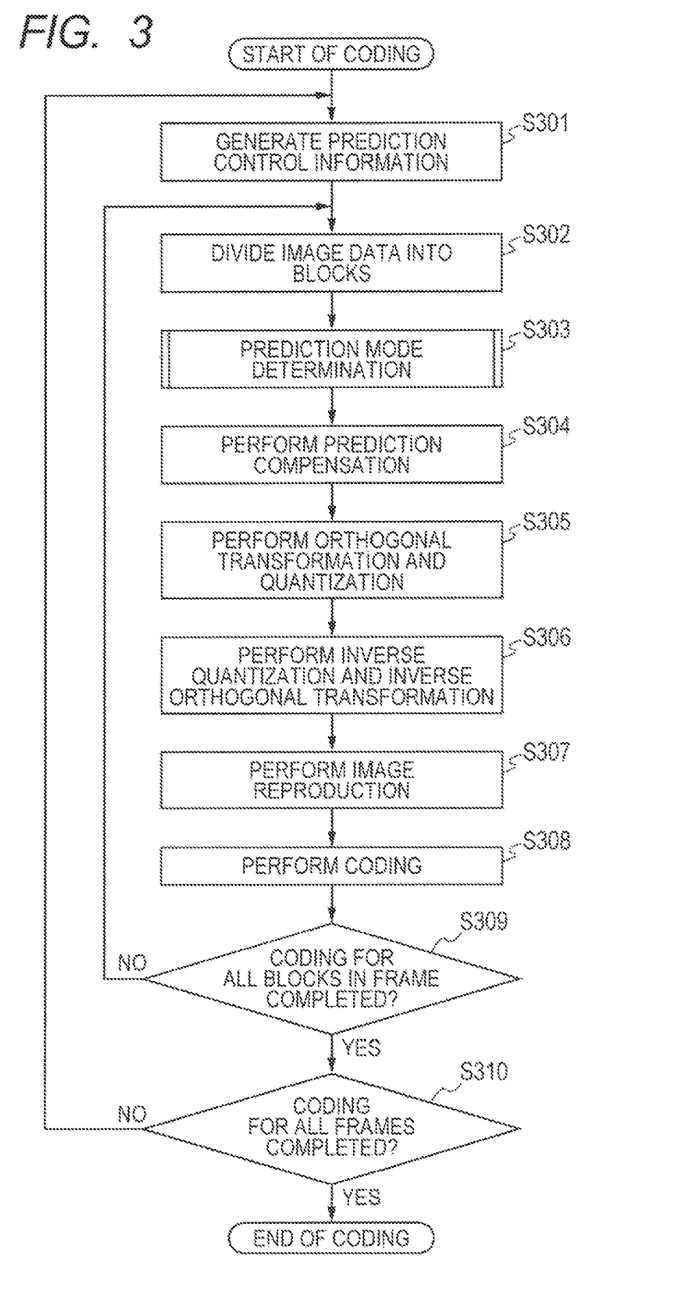
FIG. 3 is a flow chart for describing an operation example by the image coding apparatus according to the embodiment.

Next, an operation of the image coding apparatus according to the present embodiment will be described. FIG. 3 is a flow chart for describing an operation example of the image coding apparatus according to the present embodiment.

In S301, the prediction control information generating unit 103 generates prediction control information used for controlling the calculation of the priority mode required in determining the intra prediction mode and then outputs the generated prediction control information to the prediction mode determining unit 104. In S302, the block dividing unit 102 cuts out the image data which was input from the terminal 101 into plural blocks and then outputs the block-level image data to the subsequent stage. In S303, the prediction mode determining unit 104 performs the intra prediction, the inter prediction or the like and determines the optimum prediction mode and then stores the obtained prediction information into the prediction mode buffer 105. In addition, the prediction information is also output to the prediction compensating unit 106 or the coding unit 111.

Figure 4:
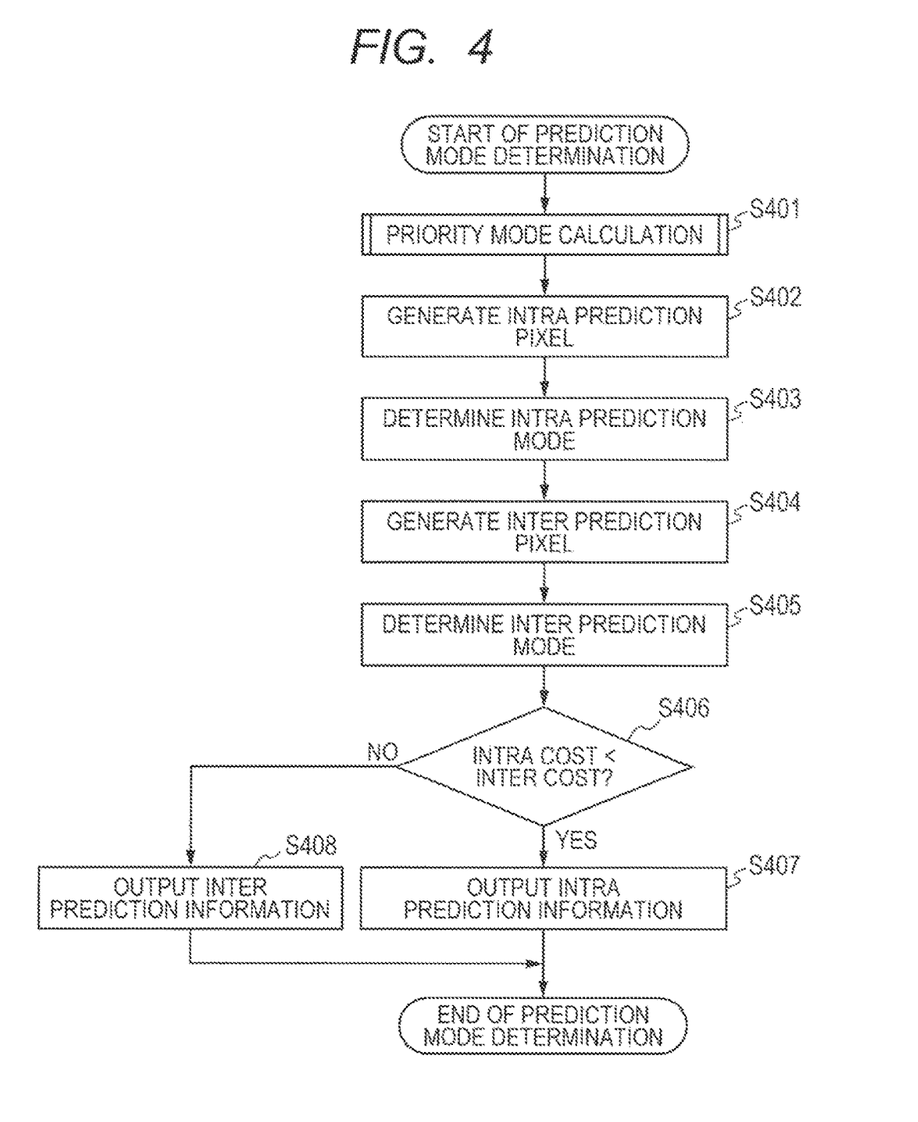
FIG. 4 is a flow chart for describing a prediction mode determining process according to the embodiment.

A prediction mode determining process to be performed in S303 will be described with reference to FIG. 4. FIG. 4 is the flow chart for describing the prediction mode determining process in the present embodiment. In S401, the priority mode calculating unit 201 calculates priority mode information required in determining the intra prediction mode from the prediction control information generated in S301 or the prediction information of neighboring blocks.

Figure 5:
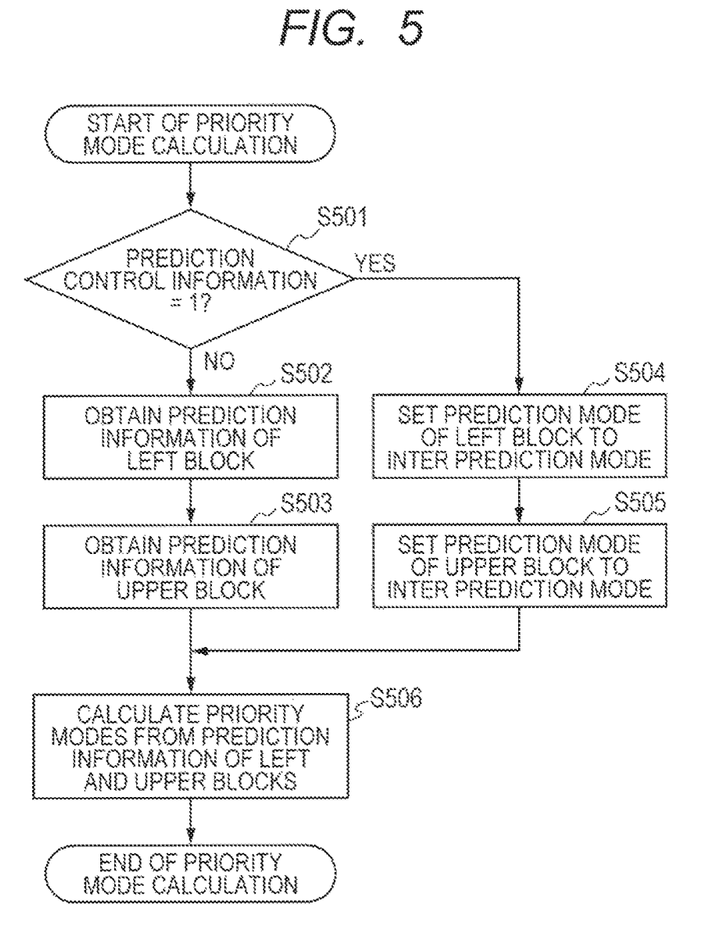
FIG. 5 is a flow chart for describing a priority mode calculating process according to the embodiment.

Here, a priority mode calculating process in the present embodiment will be described with reference to FIG. 5. FIG. 5 is the flow chart for describing the priority mode calculating process in the present embodiment. First, in S501, the priority mode calculating unit 201 performs the decision which is based on the prediction control information generated in S301, and when the prediction control information is denoted by "1", the flow advances to S504, and when the prediction control information is not denoted by "1", the flow advances to S502.

In S502, the priority mode calculating unit 201 obtains a prediction mode of a block adjacent to the left side of the target coding block by properly referring to the prediction mode buffer 105 and sets the obtained prediction mode. In S503, the priority mode calculating unit 201 obtains a prediction mode of a block adjacent to the upper side of the target coding block by properly referring to the prediction mode buffer 105 and sets the obtained prediction mode. Note that the order of performing the process of S502 and the process of S503 may be reversed.

In S504, the priority mode calculating unit 201 sets the prediction mode of the block adjacent to the left side of the target coding block as an inter prediction mode regardless of the prediction mode of the block adjacent to the left side stored in the prediction mode buffer 105. In S505, the priority mode calculating unit 201 sets the prediction mode of the block adjacent to the upper side of the target coding block as the inter prediction mode regardless of the prediction mode of the block adjacent to the upper side stored in the prediction mode buffer 105. Note that the order of performing the process of S504 and the process of S505 may be reversed.

In S506, the priority mode calculating unit 201 calculates one or more priority modes by using information of the prediction modes of blocks adjacent to the left and upper sides of the target coding block which were set by the processes in S502 to S505 and terminates the process. Although the priority mode calculating method is not especially limited, in the present embodiment, it is assumed that three-kind priority modes of a priority mode 0, a priority mode 1 and a priority mode 2 are calculated on the basis of methods indicated in FIG. 6.

Figure 6:
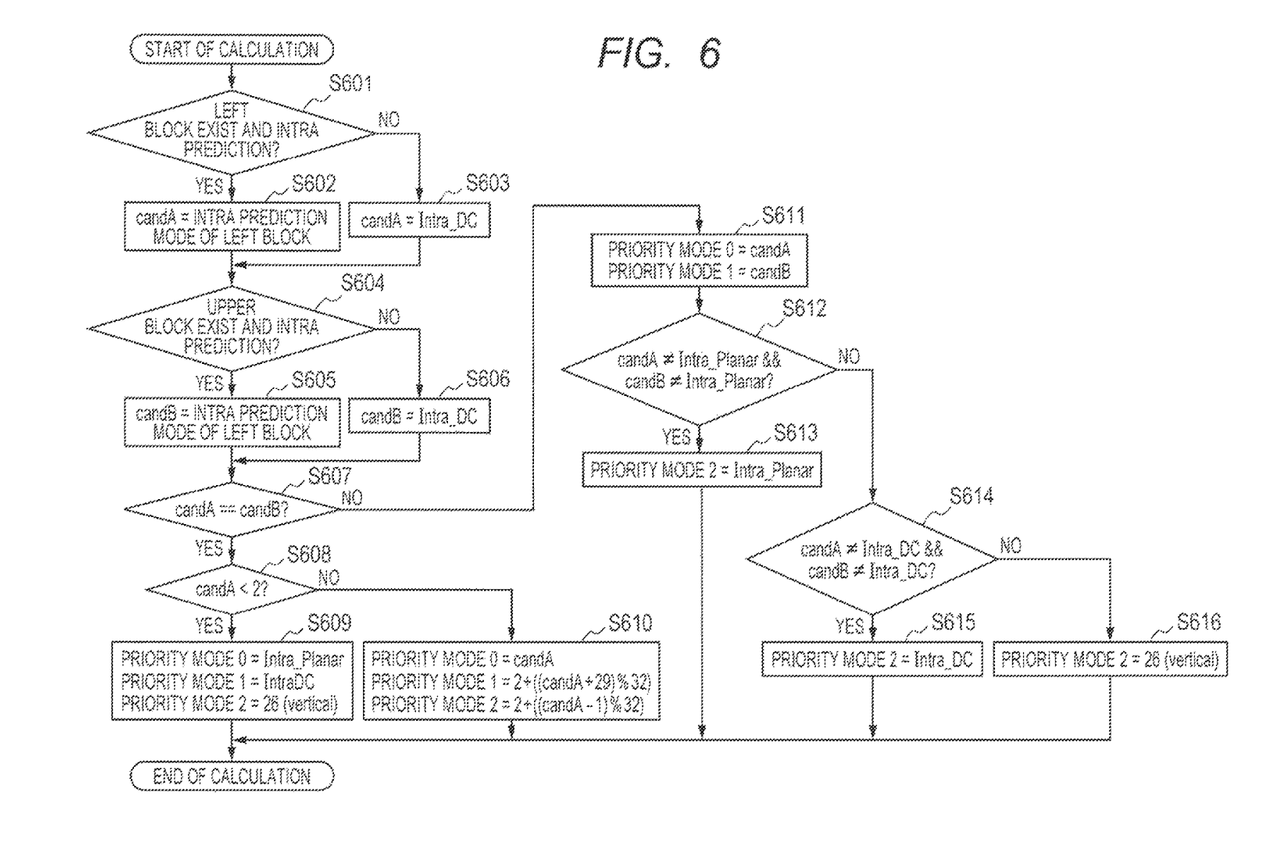
FIG. 6 is a flow chart for describing an example of the method of calculating priority modes from prediction information of adjacent left and upper blocks.

For example, when it will be described by exemplifying a case where it was decided that the prediction control information is denoted by "1" in S501, the prediction modes of the respective blocks adjacent to the left and upper sides are set to be the inter prediction modes in S504 and S505. In this case, in FIG. 6, codes of Intra_Planar, Intra_DC and Vertical(26) are calculated as the three priority modes in S609 via processes in S601, S603, S604, S606, S607 and S608. Since a priority mode calculating method exemplified in FIG. 6 is such a method described in Section 8.4.2 of the written standard of HEVC (High Efficiency Video Coding), the more detailed description will be omitted here.

As describe above, in a case where the inter prediction coding can be used as a coding system of the frame in which the target coding block is included, the priority mode calculating unit 201 determines the priority modes not according to information which indicates the prediction mode of neighboring blocks, and in a case where the inter prediction coding cannot be used as the coding system of the frame in which the target coding block is included, the priority mode calculating unit determines the priority modes according to information which indicates the intra prediction modes of neighboring blocks.

The description is returned to FIG. 4, where, in S402, the intra prediction pixel generating unit 202 generates an intra prediction image for each the intra prediction mode from the coded pixels, which are the neighbor of the target coding block, stored in the frame memory 110. Further, the prediction errors are calculated from the generated intra prediction image and a block-level input image divided in S302.

In S403, the intra prediction mode determining unit 203 calculates a coding cost for each the intra prediction mode from the priority mode information calculated in S401 or the prediction errors calculated in S402. Then, an optimum intra prediction mode is determined by comparing the calculated coding cost for each the intra prediction mode with others. In addition, a coding cost corresponding to the determined optimum intra prediction mode is calculated as an intra cost.

Although a calculating method of the coding cost is not specially limited, the coding cost is assumed to be calculated on the basis of the following expression (1) in the present embodiment.

$$\text{Cost} = \text{Dist} + \lambda \times \text{Bits} \qquad (1)$$

In the expression (1), the Cost is a coding cost to be calculated. The Dist is such a value of indicating the total amount of the prediction errors calculated in S402, and an SAD (Sum of Absolute Difference), which is the difference absolute value sum, or the like is used. The $\lambda$ is a coefficient which is defined in accordance with a quantization parameter. The Bits means the prediction of predicting the code amount required in identification in a case where a target coding mode was used.

In the HEVC, the generated code amount of a prev_intra_luma_pred_flag code, an mpm idx code or a rem_intra_luma_pred_mode code described in Sections 7.3.8.5 of the written standard of HEVC is predicted. A predicting method of the generated code amount of the each code is not especially limited, and the generated code amount may be accurately calculated by modeling an operation of the entropy coding or the generated code amount may be estimated from the amount of binary data before the entropy coding.

In the present embodiment, the coding cost is assumed to be calculated by treating the sum of predictive generated code amounts of the prev_intra_luma_pred_flag code and the mpm_idx code as the Bits for the prediction mode which is designated as the priority mode in S401. On the other hand, the sum of predictive generated code amounts of the prev_intra_luma_pred_flag code and the rem_intra_luma_pred_mode code is treated as the Bits for the prediction mode which is not designated as the priority mode in S401.

In the HEVC, the mpm idx code takes values of 0 to 2, and the rem_intra_luma_pred_mode code takes values of 0 to 31. According to this fact, since the code length of the mpm_idx code becomes shorter than that of the rem_intra_luma_pred_mode code, the priority modes are likely to be selected easier than other modes as a result.

In S404, the inter prediction pixel generating unit 204 generates an inter prediction image for each the motion vector from pixels of a picture which was coded before a target coding picture is coded. In addition, the prediction errors are calculated from the generated inter prediction image and the block-level input image divided in blocks in S302.

In S405, the inter prediction mode determining unit 205 calculates a coding cost for each the motion vector by using the prediction errors for each the motion vector calculated in S404. Then, an optimum motion vector is determined by comparing the calculated coding cost for each the motion vector with others. In addition, a coding cost corresponding to the determined optimum motion vector is calculated as an inter cost. In the present embodiment, the coding cost is assumed to be calculated on the basis of a calculating method indicated in the expression (1) similar to a case in S403.

In S406, the prediction mode determining unit 206 compares the intra cost calculated in S403 with the inter cost calculated in S405. As a result of the comparison, when the intra cost is smaller, the flow advances to S407, and when the intra cost is not smaller, the flow advances to S408. In the present embodiment, when the intra cost is identical with the inter cost, the flow is made to advance to S408, however, the flow may advance to S407.

In S407, the prediction mode determining unit 206 outputs identification information, which indicates the intra prediction, together with information of the optimum intra prediction mode determined in S403 as the prediction information. More specifically, the prediction information is coded by the coding unit 111 in S308 to be described later and becomes the prev_intra_luma_pred_flag code, the mpm_idx code or the rem_intra_luma_pred_mode code. Consequently, if the optimum intra prediction mode determined in S403 coincides with the priority mode calculated in S401, since the final code length becomes the shorter length, an effect of improving the coding efficiency is obtained.

In S408, the prediction mode determining unit 206 outputs identification information, which indicates the inter prediction, together with the optimum motion vector determined in S405 as the prediction information. In processes indicated in FIG. 4, the order of performing the processes of S402 and S403 and the processes of S404 and S405 may be reversed or may be kept in parallel.

The description is returned to FIG. 3, where, in S304, the prediction compensating unit 106 performs the intra prediction, the inter prediction or the like to the block-level image data, which was input from the block dividing unit 102, on the basis of the prediction mode determined in S303 and generates prediction image data. Further, the prediction errors are calculated from the image data, which were input, and the generated prediction image data and then outputs the calculated prediction errors to the transforming/quantizing unit 107.

In S305, the transforming/quantizing unit 107 obtains transformation coefficients by orthogonally transforming the prediction errors, which were calculated in S304 and input from the prediction compensating unit 106, in block-by-block basis (tree-by-tree basis) and further calculates quantization coefficients by performing the quantization. The calculated quantization coefficients are output to the inverse quantizing/inverse transforming unit 108 and the coding unit 111. In S306, the inverse quantizing/inverse transforming unit 108 reproduces the transformation coefficients by inversely quantizing the quantization coefficients, which were calculated in S305 and input from the transforming/quantizing unit 107, and further reproduces the prediction errors by performing an inverse orthogonal transformation. The reproduced prediction errors are output to the image reproducing unit 109.

In S307, the image reproducing unit 109 first generates prediction image data on the basis of the prediction mode, which was determined in S303 and output from the prediction mode determining unit 104, by properly referring to the frame memory 110 and further generates reproduction image data from this prediction image data and the prediction errors, which were reproduced in S306 and input from the inverse quantizing/inverse transforming unit 108 and then stores the generated reproduction image data into the frame memory 110.

In S308, the coding unit 111 generates a bitstream by coding the quantization coefficient, which was calculated in S305 and output from the transforming/quantizing unit 107, and the prediction information, which was obtained in S303 and output from the prediction mode determining unit 104. Then, code data of the generated bitstream is properly output from the terminal 112.

In S309, the image coding apparatus decides whether or not the coding for all blocks in a frame was completed. When this coding was completed, the flow advances to S310, and when this coding is not yet completed, the flow advances to S302 by treating a next block as a target block. In S310, the image coding apparatus decides whether or not the coding for all frames was completed. When this coding was completed, a coding process is terminated, and when this coding is not yet completed, the flow advances to S301 by treating a next frame as a target frame.

According to the present embodiment, as for the determination of the intra prediction mode, the determining process can be performed at a high speed and efficiently by use of the pipeline implementation by calculating the priority modes by estimating neighboring blocks as inter blocks in S504 and S505. Especially, in a case where almost of the blocks are coded as a case of the inter prediction, since the priority modes calculated in S401 coincide with a mode of which the code length actually becomes the short length, an improvement effect of the coding efficiency becomes a large effect.

In the present embodiment, although the coding process in S308 is to be performed after the process in S307, the order of the process is not limited to this order if these processes are performed after the process in S305. In S503, although the prediction modes of both the adjacent blocks on the left and upper sides are set as the inter prediction, such the configuration, where the prediction mode of the one block on the left or upper side is set as the inter prediction and the other block obtains the prediction information by referring to the prediction mode buffer 105, is allowed.

Figure 7:
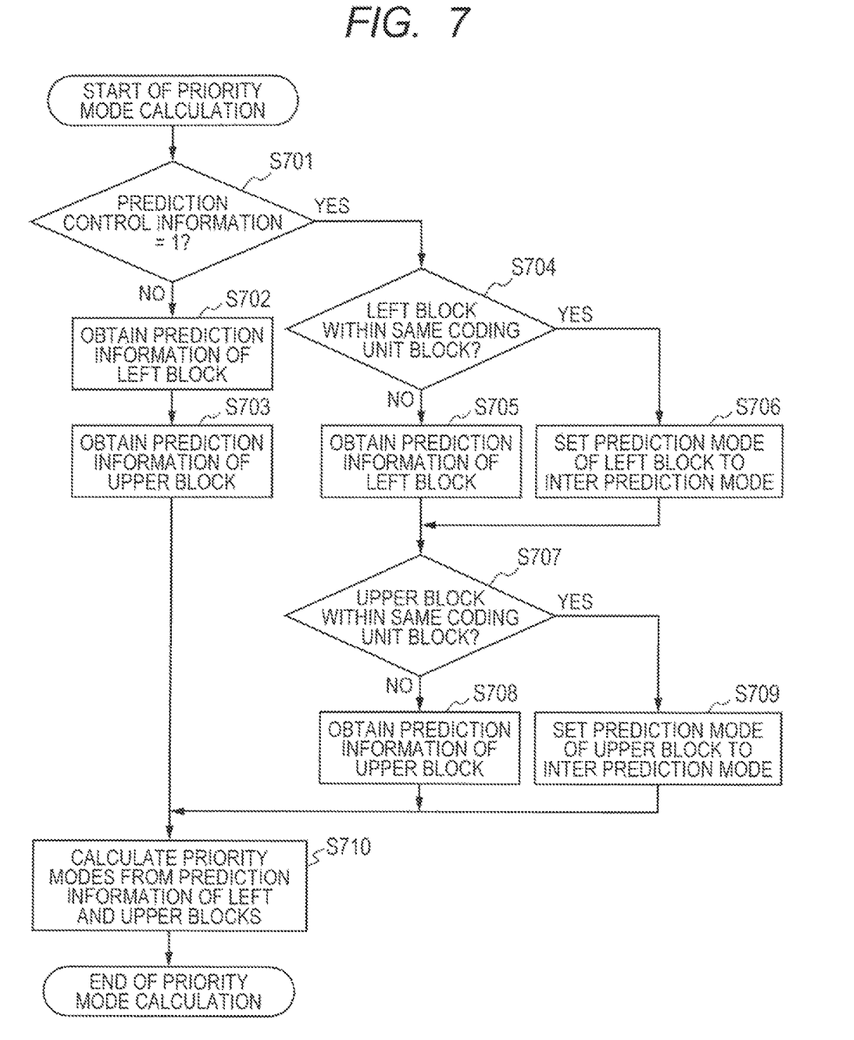
FIG. 7 is a flow chart for describing another example of the priority mode calculating process according to the embodiment.

Further, as indicated in FIG. 7, such the configuration, where a setting method of prediction information of the adjacent block is changed according to a fact whether or not the block adjacent to the left or upper side is included in a unit of the same coding block, is allowed. As for the determination of the prediction mode, in the case of implementing the pipeline with a unit of the coding block, when the adjacent block exists in a different coding block, the prediction mode to be targeted is already settled. In this case, it becomes possible to determine the intra prediction mode more efficiently by adaptively utilizing the already settled prediction mode.

FIG. 7 is the flow chart for describing another example of the priority mode calculating process in the present embodiment. First, in S701, the priority mode calculating unit 201 performs the decision which is based on the prediction control information generated in S301, and when the prediction control information is denoted by "1", the flow advances to S704, and when the prediction control information is not denoted by "1", the flow advances to S702.

In S702, the priority mode calculating unit 201 obtains a prediction mode of a block adjacent to the left side of the target coding block by properly referring to the prediction mode buffer 105 and then sets the obtained prediction mode. In S703, the priority mode calculating unit 201 obtains a prediction mode of a block adjacent to the upper side of the target coding block by properly referring to the prediction mode buffer 105 and then sets the obtained prediction mode. Note that the order of performing the process of S702 and the process of S703 may be reversed.

In S704, the priority mode calculating unit 201 decides whether or not the block adjacent to the left side of the target coding block is included in the same coding block. When the block adjacent to the left side exists in the same coding block, the flow advances to S706, and the priority mode calculating unit 201 sets the prediction mode of the block adjacent to the left side as the inter prediction mode. On the other hand, when the block adjacent to the left side exists in the different coding block, the flow advances to S705, and the priority mode calculating unit 201 obtains the prediction mode of the block adjacent to the left side by properly referring to the prediction mode buffer 105 and sets the obtained prediction mode.

In S707, the priority mode calculating unit 201 decides whether or not the block adjacent to the upper side of the target coding block is included in the same coding block. When the block adjacent to the upper side exists in the same coding block, the flow advances to S709, and the priority mode calculating unit 201 sets the prediction mode of the block adjacent to the upper side as the inter prediction mode. On the other hand, when the block adjacent to the upper side exists in the different coding block, the flow advances to S708, and the priority mode calculating unit 201 obtains the prediction mode of the block adjacent to the upper side by properly referring to the prediction mode buffer 105 and sets the obtained prediction mode.

In S710, the priority mode calculating unit 201 calculates the priority modes similar to the case of S506 indicated in FIG. 5 by using information of the prediction modes of the blocks adjacent to the left and upper sides of the target coding block which was set in the aforementioned process and then terminates the process. Note that the order of performing the processes of S704 to S706 and the processes of S707 to S709 may be reversed.

In the present embodiment, although the three priority modes are to be calculated on the basis of the processes indicated in the flow chart of FIG. 6, the number of priority modes to be calculated is not limited to this case. For example, when the prediction control information calculated in S301 is denoted by "1", it is possible that only two modes of Intra_Planar and Intra_DC, which are the non-directive predictions, are treated as the priority modes or only one of them is treated as the priority mode.

In the present embodiment, although such the configuration, where the image data reproduced in the image reproducing unit 109 is stored into the frame memory 110 as it is to be referred to the prediction mode determining unit 104 or the prediction compensating unit 106, is adopted, an in-loop filtering process may be performed in order to improve the image quality. Such the configuration, where the image data reproduced with a unit of the block is stored into the frame memory 110 and the in-loop filtering process is performed with a unit of the frame and then the image data which was filter-processed is restored into the frame memory 110, can be also adopted. In such the case, the image data before performing the filtering process is to be referred for the intra prediction and the image data after performing the filtering process is to be referred for the inter prediction in the prediction mode determining unit 104 or the prediction compensating unit 106.

(Another Embodiment)

Figure 8:
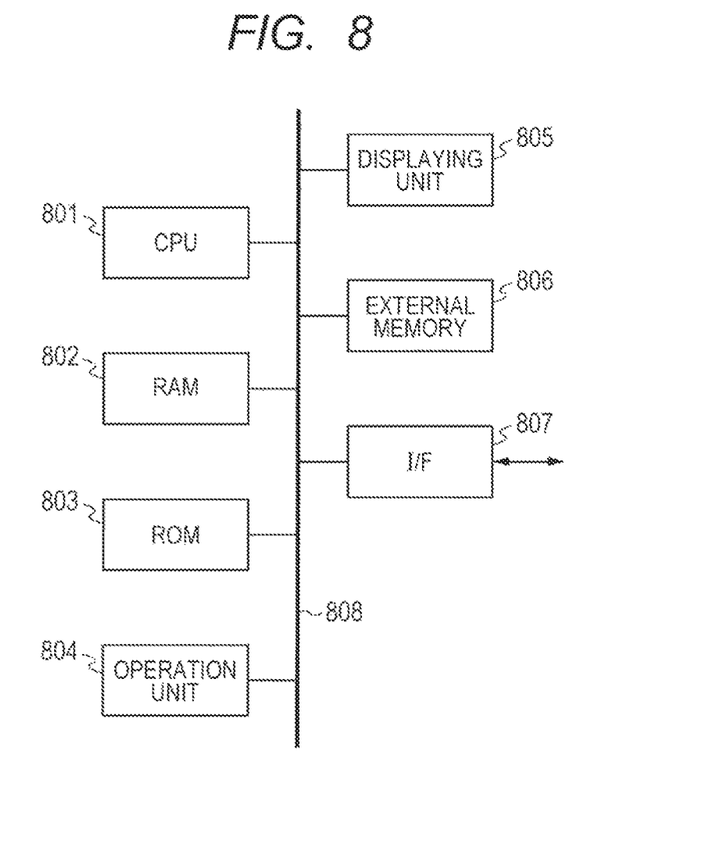
FIG. 8 is a block diagram illustrating a hardware constitution example by which the image coding apparatus according to the embodiment can be achieved.

In the above embodiment, each processing unit in the image coding apparatus illustrated in FIG. 1 is constituted by the hardware. However, the process of each processing unit of the image coding apparatus may be performed based on a computer program. Incidentally, FIG. 8 is a block diagram illustrating an example of the hardware constitution of a computer by which the image coding apparatus according to the embodiment can be achieved.

A CPU (central processing unit) 801 entirely controls the computer by using the computer programs and the data stored in a RAM (random access memory) 802 and a ROM (read only memory) 803, and also performs various processes as the above processes to be performed by the image coding apparatus in the above embodiment. That is, the CPU 801 functions as each processing unit illustrated in FIG. 1. In other words, the processes described in the above flow charts are mainly controlled by the CPU 801.

The RAM 802 comprises the area for temporarily storing the computer programs and the data loaded from an external memory 806, data externally obtained via an I/F (interface) 807, and the like. Moreover, the RAM 802 comprises the working area to be used by the CPU 801 to perform various processes. That is, the RAM 802 can be allocate as a frame memory, and can properly provide other various areas. Besides, the ROM 803 stores therein the setting data, the boot programs and the like for the computer.

An operation unit 804, which is constituted by a keyboard, a mouse and the like, can input various instruction to the CPU 801 via the operations by a user of the computer. A displaying unit 805, which is constituted by, e.g., a liquid crystal display, displays the process results by the CPU 801. The external memory 806 is a large-capacity information storing device such as a hard disk drive. The external memory 806 stores therein the OS (operating system), and the computer programs for causing the CPU 801 to function as the respective units illustrated in FIG. 1. Moreover, the external memory 806 may store therein various image data to be actually processed.

The computer programs and the data stored in the external memory 806 are properly loaded to the RAM 802 under the control of the CPU 801, and then processed by the CPU 801. Incidentally, since networks such as a LAN (local area network), the Internet and the like, other devices such as a projector, a display and the like can be connected to the I/F 807, the computer can obtain and send various information via the I/F 807. Moreover, there is provided a bus 808 by which the above units are mutually connected.

The object of the present invention can be achieved also in a case where the storage medium storing the computer program codes to achieve the above functions is supplied to a system and then the computer program codes in the supplied storage medium are read and executed by the system. In this case, the computer program codes themselves read from the storage medium achieve the functions of the above embodiment, whereby the storage medium storing the relevant computer program codes constitutes the present invention. Also, the present invention can be achieved in a case where a part or all of the actual processes are performed by the OS or the like operating on the computer and thus the above functions are achieved by the processes.

Moreover, the object of the present invention may be achieved in such a manner that the computer program codes read from the storage medium are once written into the memory provided in a function expansion card inserted in the computer or a function expansion unit connected to the computer, and then a part or all of the actual processes are performed by the CPU or the like provided in the function expansion card or the function expansion unit on the basis of the instructions of the computer program codes, thereby achieving the above functions. When the present invention is applied to the storage medium, the computer programs codes corresponding to the processes in the above flow charts are stored in the storage medium.

Incidentally, since the above embodiment merely shows the concretization example in case of carrying out the present invention, the technical scope of the present invention should not be interpreted in a limited way by the above embodiment. That is, the present invention can be carried out in various ways without departing from the technical concept or the main characteristics thereof.

According to the above embodiments, in the case where the inter prediction can be used for the target coding frame, it is possible to effectively determine the intra prediction modes at high speed by considering the neighboring blocks to have been coded with the inter prediction and determining the intra prediction modes.

(Other Embodiments)

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-011726, filed Jan. 23, 2015, which is hereby incorporated by reference herein in its entirety.

What is claimed is:

1. An image coding apparatus which is capable of coding an image using a coding system including inter prediction coding and intra prediction coding which uses an intra prediction mode, the apparatus comprising:
    a priority mode determining unit configured to determine a priority mode which can be used for determining an intra prediction mode of a target block, by using at least a mode which can be, in the coding system, a mode of a neighboring block of the target block;
    an intra prediction mode determining unit configured to determine the intra prediction mode of the target block, based on the priority mode determined by the priority mode determining unit; and
    a coding unit configured to perform the inter prediction coding or the intra prediction coding which uses the intra prediction mode determined by the intra prediction mode determining unit,
    wherein, in a case where the inter prediction coding can be used for a frame in which the target block is included, the priority mode determining unit determines the priority mode, without depending on the mode of the neighboring block, by regarding the neighboring block as a block in which the inter prediction coding is used.

2. The image coding apparatus according to claim 1, wherein, in a case where the inter prediction coding cannot be used for the frame in which the target block is included, the priority mode determining unit determines the priority mode of the target block, by using the mode of the neighboring block.

3. The image coding apparatus according to claim 1, wherein the priority mode is the intra prediction mode which is capable of being encoded with fewer bits than other intra prediction modes.

4. The image coding apparatus according to claim 1, wherein the coding system is based on High Efficiency Video Coding (HEVC).

5. The image coding apparatus according to claim 1,
    wherein, in a case where the mode of the neighboring block has been settled, the priority mode determining unit determines the priority mode of the target block, by using the mode of the neighboring block, and
    wherein, in a case where the mode of the neighboring block is not settled and the inter prediction coding can be used as the coding of method for the frame in which the target block is included, the priority mode determining unit determines the priority mode, without depending on the mode of the neighboring block, by regarding the neighboring block as a block in which the inter prediction coding is used.

6. An image coding method of an image coding apparatus which is capable of coding an image using a coding system including inter prediction coding and intra prediction coding which uses an intra prediction mode, the method comprising:
    determining a priority mode which can be used for determining an intra prediction mode of a target block, by using at least a mode which can be, in the coding system, a mode of a neighboring block of the target block;
    determining the intra prediction mode of the target block, based on the determined priority mode; and
    performing the inter prediction coding or the intra prediction coding using the determined inter prediction mode or intra prediction mode,
    wherein, in a case where the inter prediction coding can be used for a frame in which the target block is included, the priority mode is determined without depending on the mode of the neighboring block, by regarding the neighboring block as a block in which the inter prediction coding is used.

7. A non-transitory computer readable storage medium which stores a program to cause a computer to function as a priority mode determining unit, an intra prediction mode determining unit, and a coding unit of an image coding apparatus which is capable of coding an image using a coding system including inter prediction coding and intra prediction coding which uses an intra prediction mode, wherein:
    the priority mode determining unit determines a priority mode which can be used for determining an intra prediction mode of a target block, by using at least a mode which can be, in the coding system, a mode of a neighboring block of the target block,
    the intra prediction mode determining unit determines the intra prediction mode of the target block, based on the priority mode determined by the priority mode determining unit,
    the coding unit performs inter prediction coding or the intra prediction coding using the intra prediction mode determined by the intra prediction mode determining unit, and
    in a case where the inter prediction coding can be used for a frame in which the target block is included, the priority mode determining unit determines the priority mode, without depending on the mode of the neighboring block, by regarding the neighboring block as a block in which the inter prediction coding is used.

* * * * *